United States Patent
Wang et al.

(10) Patent No.: US 8,989,111 B2
(45) Date of Patent: Mar. 24, 2015

(54) SYSTEM AND METHOD FOR COORDINATING MULTIPLE WIRELESS COMMUNICATIONS DEVICES IN A WIRELESS COMMUNICATIONS NETWORK

(75) Inventors: Chao-Chun Wang, Taipei (TW); Chih Shi Yee, Hsinchu (TW)

(73) Assignee: Mediatek Singapore Pte. Ltd., Singapore (SG)

( * ) Notice: Subject to any disclaimer, the term of this patent is extended or adjusted under 35 U.S.C. 154(b) by 0 days.

(21) Appl. No.: 13/382,588

(22) PCT Filed: Jul. 12, 2011

(86) PCT No.: PCT/IB2011/001929
§ 371 (c)(1),
(2), (4) Date: Jan. 6, 2012

(87) PCT Pub. No.: WO2012/007838
PCT Pub. Date: Jan. 19, 2012

(65) Prior Publication Data
US 2013/0188565 A1    Jul. 25, 2013

Related U.S. Application Data

(60) Provisional application No. 61/363,755, filed on Jul. 13, 2010.

(51) Int. Cl.
*H04W 4/00* (2009.01)
*H04W 72/04* (2009.01)
*H04W 72/12* (2009.01)
*H04W 74/08* (2009.01)

(52) U.S. Cl.
CPC ............ *H04W 72/04* (2013.01); *H04W 72/121* (2013.01); *H04W 74/0816* (2013.01)

USPC .......................................... 370/329; 370/330

(58) Field of Classification Search
USPC ................. 370/329, 328, 342, 408, 468, 338; 455/69

See application file for complete search history.

(56) References Cited

U.S. PATENT DOCUMENTS 7,460,549 B1 * 12/2008 Cardei et al. .................. 370/408
2007/0097909 A1 * 5/2007 Khandekar et al. ........... 370/329

(Continued)

*Primary Examiner* — Andrew Lai
*Assistant Examiner* — Jamaal Henson
(74) *Attorney, Agent, or Firm* — McClure, Qualey & Rodack, LLP

(57) ABSTRACT

A method for allocating radio resources by a coordinating wireless communications device in a wireless communications network. The wireless communications network occupies a plurality of narrow-band channels. The method includes: obtaining supported narrow-band channels supported by a wireless communications device joining the wireless communications network, the supported narrow-band channels including a first subset of the narrow-band channels; partitioning the plurality of narrow-band channels into a set of non-overlapping operating channels, each of the non-overlapping operating channels including a second subset of the narrow-band channels; assigning the wireless communications device to an assigned non-overlapping operating channel, wherein the bandwidth of the assigned non-overlapping operating channel is less or equal to the bandwidth of the supported narrow-band channels supported by the wireless communications device; and allocating the radio resources to the wireless communications device, wherein the wireless communications device exchanges data with other wireless communications devices.

21 Claims, 6 Drawing Sheets

(56) References Cited

U.S. PATENT DOCUMENTS

2007/0211681 A1* 9/2007 Sun et al. .................. 370/338
2010/0309869 A1* 12/2010 Kim et al. .................. 370/329
2011/0136495 A1* 6/2011 Chen et al. .................. 455/450

* cited by examiner

SYSTEM AND METHOD FOR COORDINATING MULTIPLE WIRELESS COMMUNICATIONS DEVICES IN A WIRELESS COMMUNICATIONS NETWORK

CROSS-REFERENCE TO RELATED APPLICATION

This application is a co-pending application which claims priority to PCT Application No. PCT/IB2011/001929, filed Jul. 12, 2011 entitled "System and Method for Coordinating Multiple Wireless Communication Devices in a Wireless Communication Network", herein incorporated by reference in its entirety. This application also claims priority to, and the benefit of, US 61/363,755, filed Jul. 13, 2010, herein incorporated by reference in its entirety.

TECHNICAL FIELD

The disclosure relates in general to a wireless communications network.

BACKGROUND

In a WLAN (wireless local area network) system, such as IEEE802.11ac, an 802.11ac BSS (basic service set) can employ spatial diversity technique, DL-MU-MIMO (downlink multi-user multi-input multi-output), to increase its throughput. A high-rate wide band wireless access point (AP) aggregating a plurality of narrow band channels is able to manage wider bandwidth channels and manage wireless stations (STA) of different generations occupying different channel bandwidth. By spatial domain diversity, an 802.11ac AP coalesces one or more narrow channels (20 MHz) into one wide band channel (for example, 160 MHz).

The 802.11ac AP is capable of supporting channels of wider bandwidth, up to 160 MHz. The 802.11ac BSS supports a variety of 802.11 series STAs including legacy STAs (for example, 802.11b/g/n STA) and non-legacy STA (for example, 802.11ac STA).

The bandwidth supported by STAs of an 802.11ac BSS may range from 20 MHz up to 160 MHz. For example, the bandwidth supported by 802.11b/g STA is 20 MHz; the bandwidth supported by 802.11n STA may be 40 MHz; and the bandwidth supported by 802.11ac STA may be 80 MHz or 160 MHz. Therefore, the channel bandwidth available for each MU-MIMO group is gated by the participating STAs with the smallest channel bandwidth Even though the high-rate wide band wireless environment provides wider bandwidth, the actual channel bandwidth utilized is limited by the STA having the smallest channel bandwidth. As a result, the radio resource is underutilized.

For example, the high-rate wide band wireless access point typically equips with multiple antennas and the multi-user multi-input multi-output (MU-MIMO) scheme is adopted to improve the performance of the wireless network by allowing simultaneous transmissions to a group of STAs. But, in the current MU-MIMO scheme, channels not involved in the current MU-MIMO operation are left un-utilized.

FIG. 1A (PRIOR ART) shows channel bandwidth utilization in the current DL-MU-MIMO scheme. For example, the AP 110 and the STA 121 both support channels 1~8; the STA 122 supports channel 3; and the STA 123 supports channels 3 and 4. Assuming that the STAB 121~123 are of the same group. As shown in FIG. 1A, only channel 3 is utilized when the group (including the STA 121~123) is active. In other words, channels 1~2 and 4~8 are unutilized and wasted. So, the radio resource is underutilized.

Further, in coexistence with legacy OBSS (overlap BSS), the 802.11ac AP can not actively manage its channel. FIG. 1B shows that the AP can not actively manage its channel due to in coexistence with legacy OBSS. As shown in FIG. 1B, OBSSs 131 and 132 occupying channel 3 (for example, a channel being 20 MHz) and channels 5~6 (40 MHz) may prevent the 802.11ac AP from acquiring a wider channel. The 802.11ac AP is capable of coalescing 8 channels to start a BSS, but there are only 2 contiguous channels (40 MHz) available.

BRIEF SUMMARY

Embodiments of a system and a method for coordinating multiple wireless communications devices in a wireless communications network are disclosed for improving radio resource utilization.

An exemplary embodiment of the disclosure provides a method for allocating radio resources by a coordinating wireless communications device in a wireless communications network including a plurality of wireless communications devices, the wireless communications network occupying a plurality of narrow-band channels, the method including: obtaining supported narrow-band channels supported by a wireless communications device joining the wireless communications network, the supported narrow-band channels including a first subset of the narrow-band channels; partitioning the plurality of narrow-band channels into a set of non-overlapping operating channels, each of the non-overlapping operating channels including a second subset of the narrow-band channels; assigning the wireless communications device to an assigned non-overlapping operating channel, wherein the bandwidth of the assigned non-overlapping operating channel is less or equal to the bandwidth of the supported narrow-band channels supported by the wireless communications device; and allocating the radio resources to the wireless communications device, wherein the wireless communications device exchanges data with other wireless communications devices.

Another exemplary embodiment of the disclosure provides a wireless communication method applicable to a wireless communications device in a wireless communications network comprising a coordinating wireless communications device and a plurality of wireless communications devices, the wireless communications network occupying a plurality of narrow-band channels, the method including: joining the wireless communications network and sending information about supported narrow-band channels of the wireless communications device, the supported narrow-band channels including a first subset of the narrow-band channels; receiving a partition information from the coordinating wireless communications device, the coordinating wireless communications device partitioning the narrow-band channels into a set of non-overlapping operating channels, each of the non-overlapping operating channels including a second subset of the narrow-band channels; migrating to an assigned non-overlapping operating channel in accordance with an assignment received from the coordinating communications device, wherein the bandwidth of the assigned non-overlapping operating channel is less or equal to the bandwidth of the supported narrow-band channels supported by the wireless communications device; and exchanging data with the plurality of communications devices, wherein radio resources are either allocated by the coordinating communications device or obtained by the wireless communications device by using a contention mechanism.

Still another exemplary embodiment of the disclosure provides a wireless communications network occupying a plurality of narrow-band channels, including: a coordinating wireless communications device; and a plurality of wireless communications devices, coordinated by the coordinating wireless communications device. The coordinating wireless communications device obtains supported narrow-band channels supported by a wireless communications device joining the wireless communications network, the supported narrow-band channels including a first subset of the narrow-band channels. The coordinating wireless communications device partitions the narrow-band channels into a set of non-overlapping operating channels, each of the non-overlapping operating channels including a second subset of the narrow-band channels. The coordinating wireless communications device assigns the wireless communications device to an assigned non-overlapping operating channel, wherein the bandwidth of the assigned non-overlapping operating channel is less or equal to the bandwidth of the supported narrow-band channels supported by the wireless communications device. The coordinating wireless communications device allocates the radio resources to the wireless communications device, wherein the wireless communications device exchanges data with other wireless communications devices.

It is to be understood that both the foregoing general description and the following detailed description are exemplary and explanatory only and are not restrictive of the disclosed embodiments, as claimed.

DETAILED DESCRIPTION OF THE DISCLOSURE

Figure 1A:
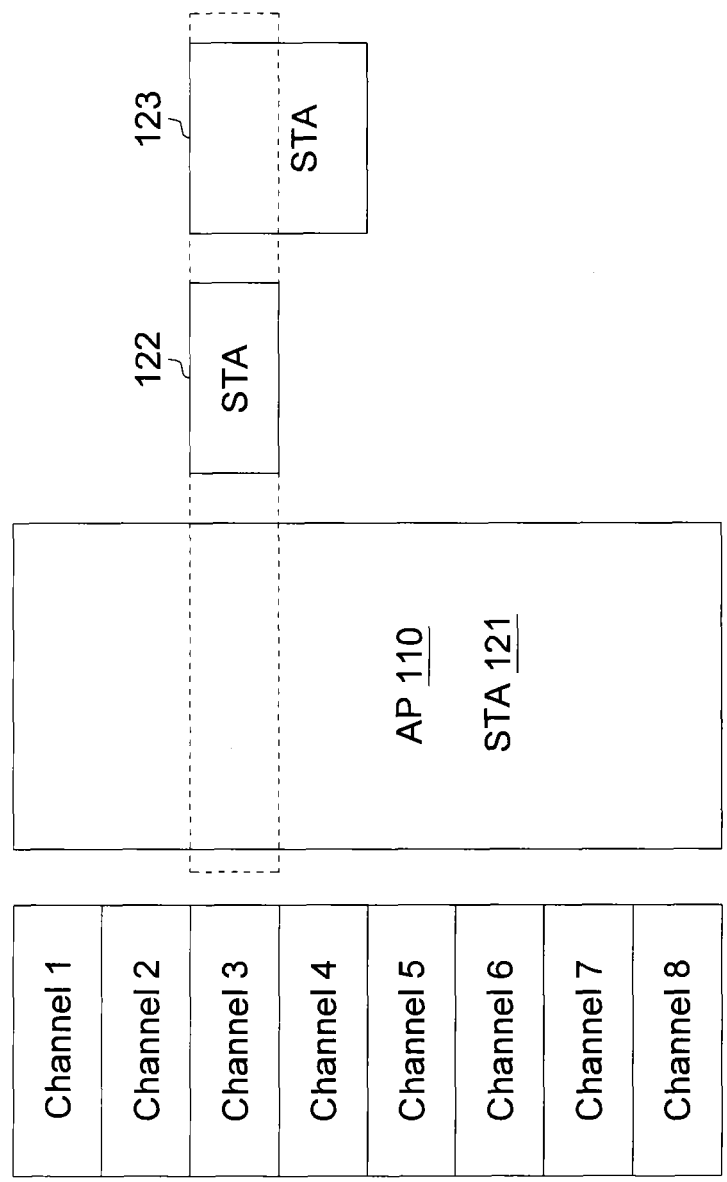
FIG. 1A (PRIOR ART) shows a channel bandwidth utilization in the current DL-MU-MIMO scheme.
Figure 1B:
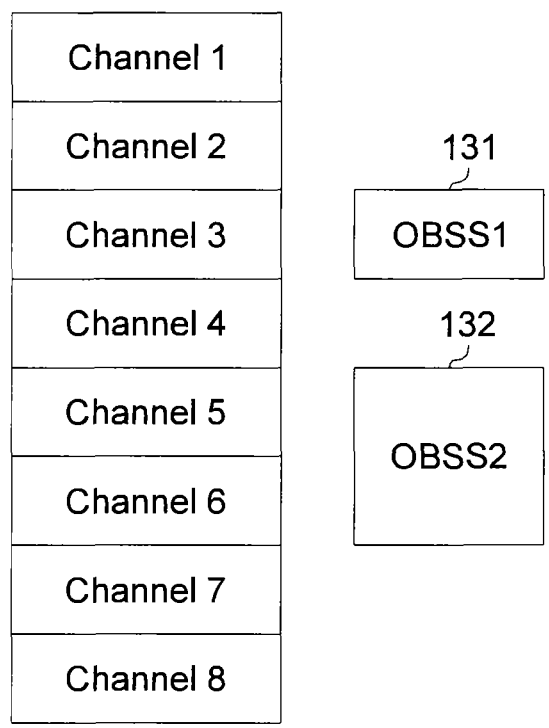
FIG. 1B shows that an AP can not actively manage its channel utilization due to in coexistence with legacy OBSS.

The disclosure describes a method and system for managing a wireless communications network having at least an access point (AP) and a plurality of mobile stations (STA).

In the following, a wide Band Access Point (WBAP) refers to a wireless access point capable of supporting n narrow band channels (n being a natural number). A narrow band channel is for example but not limited by 20 MHz. Also, AP may be referred as a coordinating wireless communications device; and a STA may be referred as a wireless communications device. An operating channel refers to a channel including one or more non-overlapping narrow band channels. A non-overlapping operating channel refers to an operating channel that does not contain any narrow band channel which overlaps with any other operating channel.

The AP coalescing available narrow band channels forms a BSS supporting wideband channel and selects one narrow band channel as the primary channel. The AP and the STAs exchange management and control information of the wireless communications network through the primary channel. A narrow band channels is selected by the AP as the primary channel in accordance with a first pre-determined rule. After the AP selects the primary channel, the AP announces the primary channel to all STAs.

The first pre-determined rule determining the number of the non-overlapping operating channels is for example but not limited to based on parameters selected from a group including the availability of the number of narrow-band channels, the level of the interference of each narrow-band channel, the supported narrow-band channels of each of the STAs.

The bandwidth of the wideband channel is determined by the AP based on channel conditions and AP/STA capabilities. All STAs of the BSS receive one or more duplicated beacons covering up to the wideband channel sent by the AP.

Also, in the disclosure, a MU DL-FDM (multi-user downlink frequency domain multiplexing) is disclosed. The AP manages channel selection of member STAs which may include legacy STA(s) (for example, 802.11 b/g/n STA) and non-legacy STA(s) (for example but not limited to 802.11 ac STA). Each non-legacy STA operates on a group of one or more narrow band channels which form a non-overlapping operating channel. One or more non-overlapping operating channels may operate concurrently.

The AP organizes the STAs into more than one communication groups. The STAs in each communication group occupy one or more narrow band channels and the more than one communication group resides in the narrow bands. The constituents of each communication group are determined statically or dynamically by the AP in accordance with a second pre-determined rule. The AP may re-organize the STAs adaptively to improve the performance of the wireless communication network.

The second pre-determined rule determining the constituents of each communication group and determining which non-overlapping operating channel the STA is assigned to is based on algorithms selected from a group comprising best fit algorithm, first fit algorithm, the population of non-overlapping operating channel, application requirement, wherein the assignment of operation channel is done either statically or dynamically.

The AP changes the channel width occupied by the communication group in accordance with parameters such as but not limited to the bandwidth usage, and bandwidth requirements of applications deployed in the communications group.

The STAs of the more than one communication groups operate concurrently with or without the direct management of the AP. In other words, the transmission of data from the STAs to other STA(s) is either directly or relayed by the AP.

The AP directs the migration of the STAs of the communication group from one frequency band to another Now describe how to set up operating channels and groups of STAs.

The WBAP establishes a wireless communications network by sending out invitation messages embedded in radio frames (such as beacon) or management frames to STAs or by receiving unsolicited requesting messages from STAs on the primary channel. Beacon is repeated on every narrow band channel supported by the AP. The receiving of the invitation messages or sending of requesting messages starts the association and authentication process for the STA (the STA capable of occupying m narrow band channels, m being a natural number and m An STA joins the wireless communications network after exchanging the capability information with the AP and completing the association and authentication process.

Based on a predetermined allocation algorithm, the WBAP instructs the STA to occupy the p narrow band channels, where p being a natural number and p The STA uses the primary channel to exchange management messages with the WBAP.

If the STA is the first to join an infrastructure wireless network, an exemplary allocation algorithm employed by the WBAP is a first-fit algorithm, i.e., WBAP selects the first set of contiguous p narrow band channels having the least amount of noise for the WBAP and the STA. Another exemplary allocation algorithm employed by the WBAP is a best fit algorithm.

If the STA joins the infrastructure wireless network already having q STAs (q being a natural number), the WBAP statically or dynamically decides the channel assignment according to, for example but not limited to, the following factors: the number of occupants of an operating channel, number of narrow band channels supported by each STA, the bandwidth consumption of active flows which in embodiment is based on QoS (Quality of Service) setting of the flow, and overall loading of the operating channels. For example, if a 40 MHz STA is to join the infrastructure wireless network, the WBAP may assign the 40 MHz STA to a STA group occupying 40 MHz or 80 MHz, for small effect on the overall loading of the operating channels.

In one embodiment, the WBAP partitions the n narrow band channels into r (r being a natural number) non-overlapping operating channels and the WBAP divides the STAs into s groups (s being a natural number) for example according to the first predetermined rule.

For example, the WBAP may partition 160 MHz into (1) two 80 MHz non-overlapping operating channels; (2) one 80 MHz non-overlapping operating channels and two 40 MHz non-overlapping operating channels; (3) one 80 MHz non-overlapping operating channels, one 40 MHz non-overlapping operating channels and two 20 MHz non-overlapping operating channels; (4) one 80 MHz non-overlapping operating channels and four 20 MHz non-overlapping operating channels; (5) four 40 MHz non-overlapping operating channels; (6) three 40 MHz non-overlapping operating channels and two 20 MHz non-overlapping operating channels; (7) two 40 MHz non-overlapping operating channels and four 20 MHz non-overlapping operating channels; (8) one 40 MHz non-overlapping operating channels and six 20 MHz non-overlapping operating channels; or (9) eight 20 MHz non-overlapping operating channels. The channel bandwidth of the non-overlapping operating channels may be different or the same. Also, the number of STAs in each group may be different or the same.

In another embodiment, the STAs form groups, each group having a channel bandwidth determined by the channel capacity of the STAs of each group or determined by the AR If the sum of the channel bandwidth of all groups is greater than n narrow band channels, then the WBAP decides the channel bandwidth of each non-overlapping operating channel according to the QoS requirements of each of the groups and the sum of the channel bandwidth of all non-overlapping operating channels must be equal to or smaller than sum of n narrow band channels. On the contrary, if the sum of the channel bandwidth of all groups is not greater than n narrow band channels, then the channel bandwidth of each group is determined by the channel capacity of the STAs of each group.

Yet in another embodiment, if the WBAP learns that one of the STAs establishes a direct link session with one or more other STAs, i.e., the messages are exchanged directly between the STA and the one or more other STAs without relaying through the WBAP, then the WBAP may decide to re-partition the n narrow band channels and create a non-overlapping operating channel for the STA and the one or more other STAs (those having a direct link session). The re-partitioning of the n narrow band channel may be, for example but not limited by, based on the exemplary partitioning algorithms described above. There are methods known to people skilled in the art to migrate the direct link STAs to the newly setup operating channel in a timely fashion.

Yet in another embodiment, the WBAP may learn from the QoS setting of the flows that more than one set of STAs occupying one or more operating channels exchanges data interactively, i.e. the data are sent in ping-pong fashion between two STAs. For example, the exchange of request/response packets or the exchange of data/acknowledge packets. The WBAP sets up a dedicated time period for the more than one set of STAs occupying one or more operating channels for scheduled access of the radio channel. The operating channels operate synchronously.

Now data exchanges for STAs in operating channels are described.

The messages exchanged in one operating channel are either directly among STAs occupying the operating channel or relayed through the WBAP. A message may be sent to an STA (i.e. uni-cast), to one or more STAs (i.e. multicast), or to all STAs (i.e. broadcast) in the operating channel. A message sent from an STA in one operating channel may be relayed to another STA in a different operating channel by the WBAP. The WBAP coordinates the operation of non-overlapping operating channels. The concurrent operations of non-overlapping operating channels are either synchronous or asynchronous.

Every time an STA has data ready for other STA(s), the STA obtains transmission opportunities by either (1) contending for the access right (i.e. a carrier sensing collision avoidance implementation) for example but not limited to according to protocol such as 802.11 CSMA/CA, or (2) requesting the WBAP to grant the access right (i.e. a request-based implementation), or (3) a hybrid implementation which combines the previous two implementations. In other words, in the disclosure, there are at least three channel access implementations.

When STAs of a non-overlapping operating channel access the radio channel by for example but not limited by one of the channel access implementations described above, without having the WBAP to synchronize the channel access with that of another non-overlapping operating channel, the non-overlapping operating channels operate asynchronously. Otherwise, the non-overlapping operating channels operate synchronously with other operating channels.

The WBAP decides for each non-operating channel whether it should operate synchronously or asynchronously according to one or more exemplary coordinating algorithms. In one exemplary coordinating algorithm, the WBAP places the groups of STAs establishing direct link session in one of the operating channels operating asynchronously. The remaining operating channels operate synchronously coordinated by the WBAP.

Further, in the embodiment, the AP may support multi-user down-link (MU DL) traffic by the following implementations, MU DL-MIMO; MU DL-FMD or MU DL-OFDMA (Orthogonal Frequency-Division Multiple Access).

Figure 2:
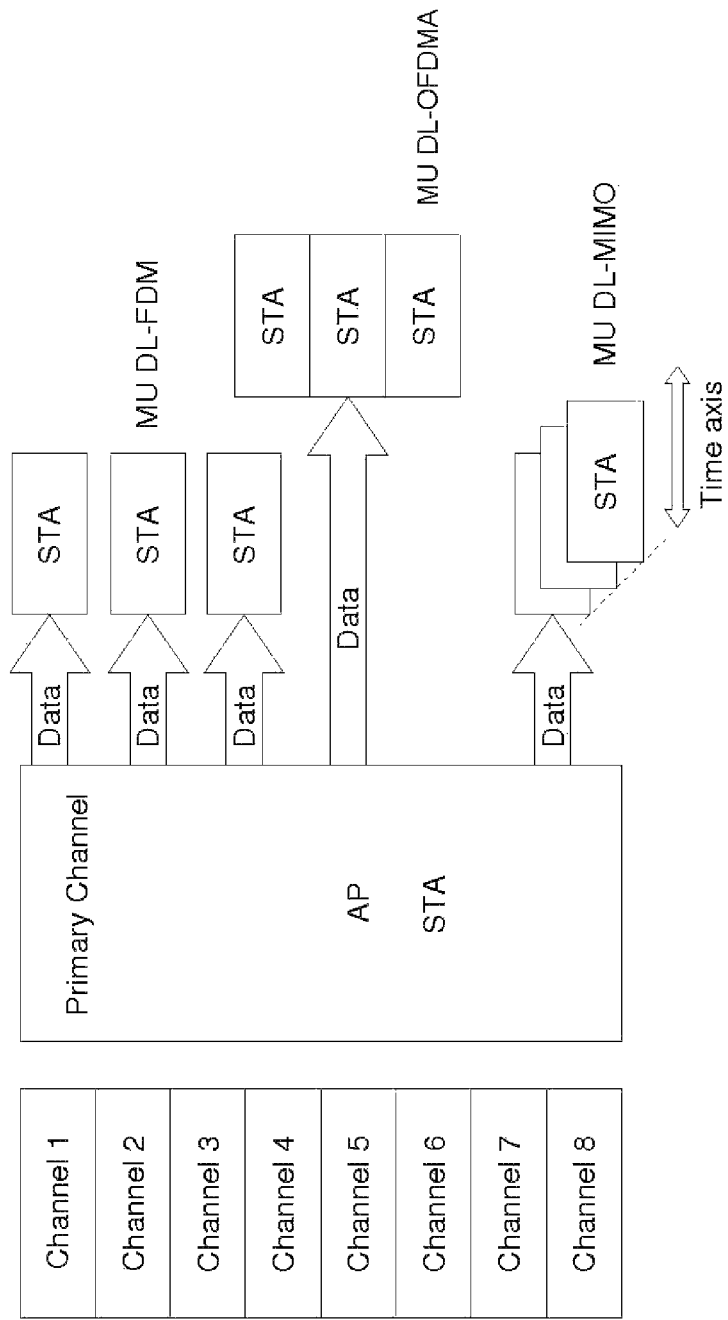
FIG. 2 shows MU DL implementations according to the embodiment of the disclosure.

To implement MU DL-MIMO, the AP selects a sub-set of coalesced channels for DL-MIMO operation. To implement MU DL-FDM, the AP instructs target STAs to switch to corresponding channels and DL traffic is sent to the corresponding channels for load balance. To implement MU DL- OFDMA, the AP selects a sub-set of coalesced channels for OFDMA-based DL-MIMO. FIG. 2 shows MU DL implementations according to the embodiment of the disclosure.

Further, in the embodiment of the disclosure, STA-to-STA(s) MU with FDM is disclosed. An STA may establish direct link session (DLS) with one or more destination STAs. The STA sends a request message to the AP for requesting channel time. The request message also includes channel bandwidth and transmission opportunity (TXOP). The AP may grant the request and instruct the participating STAs to switch to the subset of channel with request bandwidth.

Figure 3:
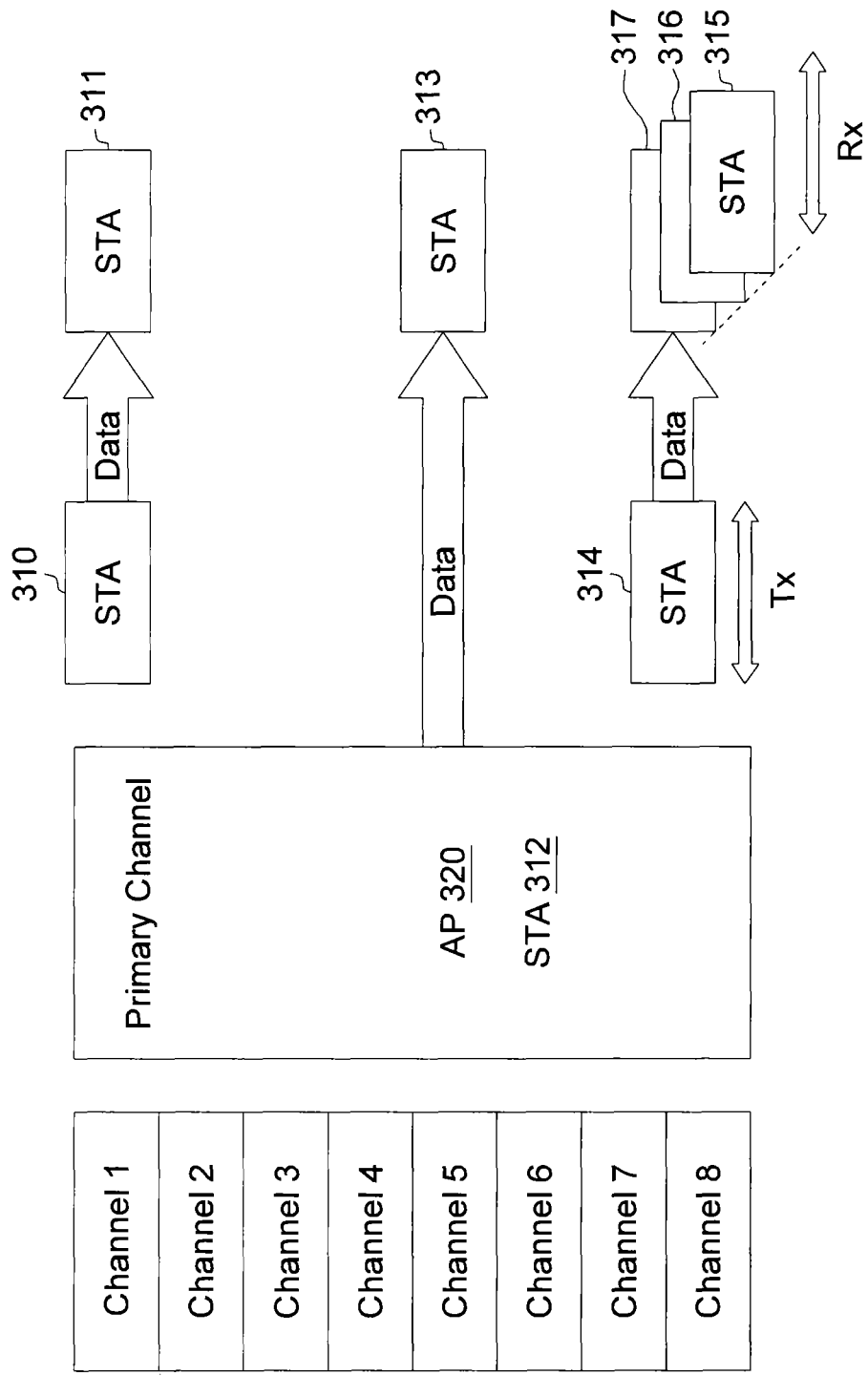
FIG. 3 shows STA-to-STA(s) MU with FDM in the embodiment of the disclosure.

FIG. 3 shows STA-to-STA(s) MU with FDM in the embodiment of the disclosure. As shown in FIG. 3, the STA 310 establishes a direct link session with the STA 311, without relaying through AP 320. Besides, the STA 312 communicates with the STA 313 with relaying through AP 320. The STA 314 communicates with the STAs 315~317 in spatial domain diversity.

Figure 4:
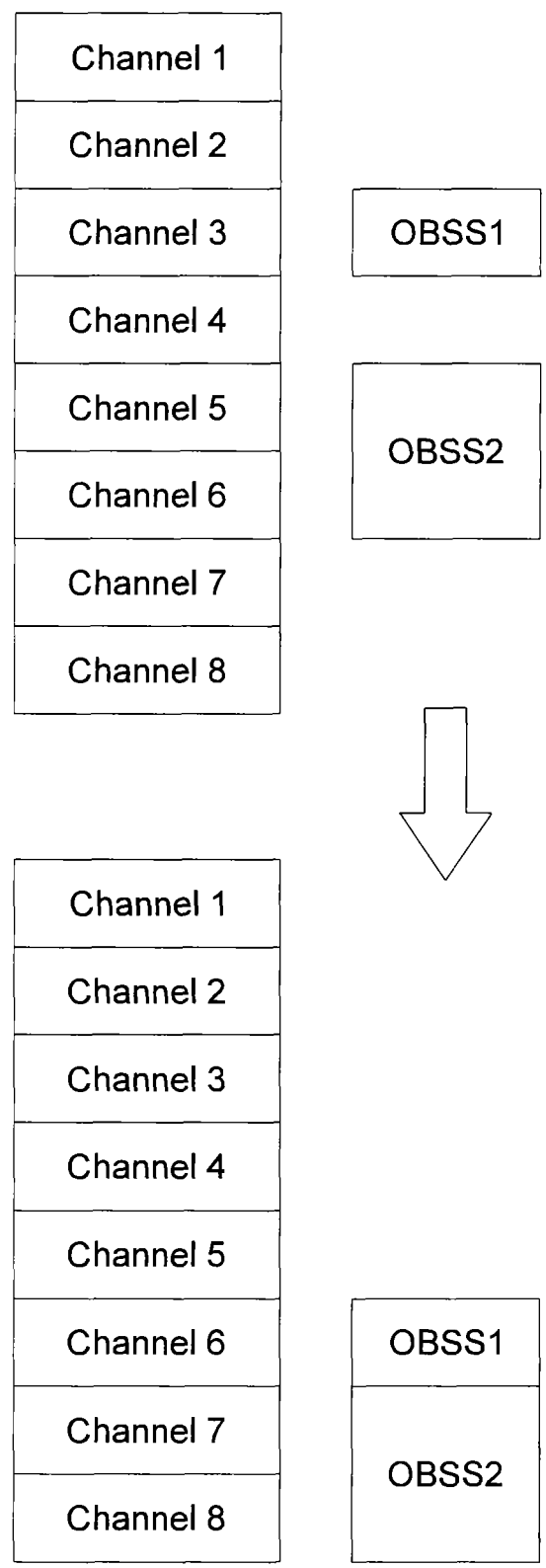
FIG. 4 shows the migration of OBSS.

Further, in the embodiment of the disclosure, the AP instructs other OBSSs to move to other channel(s) in order to obtain contiguous channels. Please refer to FIG. 4, which shows the migration of OBSS. The OBSS 1 occupies channel 3; and the OBSS 2 occupies channels 5~6. In response to AP's instruction, for example but not limited to, the OBSS 1 moves to channel 6 and the OBSS 2 moves to channels 7~8, so that contiguous channels 6~8 for the OBSSs are obtained. Further, the AP shall scan all channels, exchange channel information with STAs and APs of OBSSs.

Figure 5:
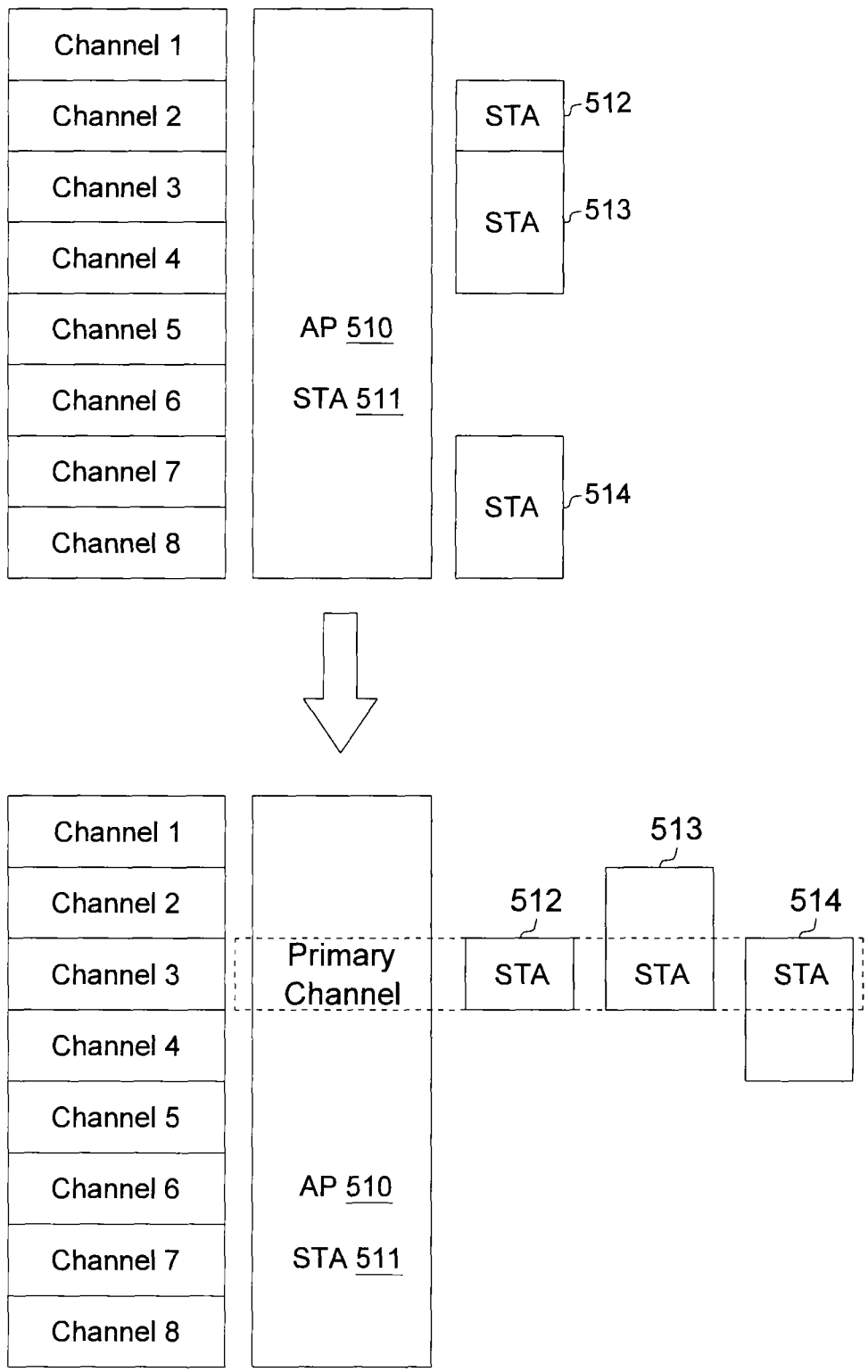
FIG. 5 shows herding of STAs in the embodiment of the disclosure.

Further, in the embodiment of the disclosure, upon receiving beacons from the AP, STAs join the BSS via the primary channel for STA herding. FIG. 5 shows herding of STAs in the embodiment of the disclosure. As shown in FIG. 5, before receiving beacons from the AP 510, the STAs 511~514 occupy channels 1~8, channels 2, channels 3~4 and channels 7~8 respectively; and in other words, the STA 512~514 are not herded. Upon receiving beacons from the AP, the STA 512 moves to occupy channel 3; the STA 513 moves to occupy channels 2~3; and the STA 514 moves to occupy channels 3~4. So, the STAs 511~514 are herded via the primary channel 3.

Further, in the embodiment, the allocation of the radio resource in each operating channel is a local decision without the intervention of the AP. The operating channel operates asynchronously with other operating channels.

Further, in the embodiment, the allocation of the radio resource of the one or more operating channels is managed and coordinated by AP. The operating channels operate synchronously.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A method for allocating radio resources by a coordinating wireless communications device in a wireless communications network including a plurality of wireless communications devices, the wireless communications network occupying a plurality of narrow-band channels, the method comprising:
   obtaining supported narrow-band channels supported by a wireless communications device joining the wireless communications network, the supported narrow-band channels including a first subset of the narrow-band channels;
   partitioning the plurality of narrow-band channels into a set of non-overlapping operating channels, each of the non-overlapping operating channels including a second subset of the narrow-band channels, wherein the bandwidth of each of the non-overlapping operating channels is determined based on parameters selected from a group comprising the availability of the number of the narrow-band channels, the level of the interference of each narrow-band channel and the respective supported narrow-band channels supported by each of the wireless communications device;
   configuring the bandwidth of each of the non-overlapping operating channels, wherein a sum of the bandwidth of all non-overlapping channels is less or equal to a sum of the bandwidth of the plurality of narrow-band channels;
   assigning the wireless communications device to a non-overlapping operating channel; and
   allocating the radio resources to the wireless communications device, wherein the wireless communications device exchanges data with other wireless communications devices.

2. The method of claim 1, wherein the assigning step is based on algorithms selected from a group comprising a best fit algorithm, a first fit algorithm, a population of non-overlapping operating channel and application requirements.

3. The method of claim 1, wherein the assigning step is either static or dynamic.

4. The method of claim 1, wherein in the allocating step, channel access of the allocated wireless communications device is determined based on a carrier sensing collision avoidance algorithm, a request based algorithm or a mix thereof.

5. The method of claim 1, wherein the wireless communications device exchanges data with other wireless communications devices directly.

6. The method of claim 1, wherein data exchange from the wireless communications device with other wireless communications devices is relayed by the coordinating wireless communications device to at least one of the wireless communications devices.

7. The method of claim 1, wherein the allocation of the radio resources in one or more operating channels is a local decision without the intervention of the coordinating wireless communications device; and the operating channel operates asynchronously with other operating channels.

8. The method of claim 1, wherein the allocation of the radio resources of one or more operating channels is managed and coordinated by the coordinating wireless communications device; and the operating channels operate synchronously.

9. A wireless communication method applicable to a wireless communications device in a wireless communications network comprising a coordinating wireless communications device and a plurality of wireless communications devices, the wireless communications network occupying a plurality of narrow-band channels, the method comprising:
   joining the wireless communications network and sending information about supported narrow-band channels of the wireless communications device, the supported narrow-band channels including a first subset of the narrow-band channels;
   receiving a partition information from the coordinating wireless communications device, the coordinating wireless communications device partitioning the narrow-band channels into a set of non-overlapping operating channels, each of the non-overlapping operating channels including a second subset of the narrow-band channels, wherein the bandwidth of each of the non-overlapping operating channels is determined based on parameters selected from a group comprising the availability of the number of the narrow-band channels, the level of the interference of each narrow-band channel and the respective supported narrow-band channels supported by each of the wireless communications device, wherein a sum of the bandwidth of all non-overlapping channels is less or equal to a sum of the bandwidth of the plurality of narrow-band channels;

migrating to an assigned non-overlapping operating channel in accordance with an assignment received from the coordinating communications device; and exchanging data with the plurality of communications devices, wherein radio resources are either allocated by the coordinating communications device or obtained by the wireless communications device by using a contention mechanism.

10. The method of claim 9, wherein the assignment of the wireless communications device to the assigned non-overlapping operating channels by the coordinating wireless communications device is based on algorithms selected from a group comprising a best fit algorithm, a first fit algorithm, the population of non-overlapping operating channel and application requirements.

11. The method of claim 9, wherein the assignment of the wireless communications device to the assigned non-overlapping operating channels by the coordinating wireless communications device is either statically or dynamically.

12. The method of claim 9, wherein the contention mechanism used by the wireless communications device to obtain the radio resources is based on a carrier sensing collision avoidance algorithm, a request based algorithm or a mix thereof.

13. The method of claim 9, wherein the allocation of the radio resources in one or more operating channels is a local decision without the intervention of the coordinating wireless communications device; and the operating channel operates asynchronously with other operating channels.

14. A wireless communications network occupying a plurality of narrow-band channels, including:
 a coordinating wireless communications device; and
 a plurality of wireless communications devices, coordinated by the coordinating wireless communications device;
 wherein:
 the coordinating wireless communications device obtains supported narrow-band channels supported by a wireless communications device joining the wireless communications network, the supported narrow-band channels including a first subset of the narrow-band channels;
 the coordinating wireless communications device partitions the narrow-band channels into a set of non-overlapping operating channels, each of the non-overlapping operating channels including a second subset of the narrow-band channels, wherein the bandwidth of each of the non-overlapping operating channels is determined based on parameters selected from a group comprising the availability of the number of the narrow-band channels, the level of the interference of each narrow-band channel and the respective supported narrow-band channels supported by each of the wireless communications device;
 the coordinating wireless communications device configures the bandwidth of each of the non-overlapping operating channels, wherein a sum of the bandwidth of all non-overlapping channels is less or equal to a sum of the bandwidth of the plurality of narrow-band channels;
 the coordinating wireless communications device assigns the wireless communications device to a non-overlapping operating channel; and
 the coordinating wireless communications device allocates the radio resources to the wireless communications device, wherein the wireless communications device exchanges data with other wireless communications devices.

15. The network of claim 14, wherein the coordinating wireless communications device assigns the wireless communications device to the assigned non-overlapping operating channel based on algorithms selected from a group comprising a best fit algorithm, a first fit algorithm, the population of non-overlapping operating channel and application requirements.

16. The network of claim 14, wherein the coordinating wireless communications device assigns the wireless communications device to the assigned non-overlapping operating channel either statically or dynamically.

17. The network of claim 14, wherein the coordinating wireless communications device allocates the radio resources to the wireless communications device based on a carrier sensing collision avoidance algorithm, a request based algorithm or a mix thereof.

18. The network of claim 14, wherein the wireless communications device exchanges data with other wireless communications devices directly.

19. The network of claim 14, wherein data exchange from the wireless communications device with other wireless communications devices is relayed by the coordinating wireless communications device to at least one of the wireless communications devices.

20. The method of claim 14, wherein the allocation of the radio resources in one or more operating channels is a local decision without the intervention of the coordinating wireless communications device; and the operating channel operates asynchronously with other operating channels.

21. The method of claim 14, wherein the allocation of the radio resources of one or more operating channels is managed and coordinated by the coordinating wireless communications device; and the operating channels operate synchronously.

\* \* \* \* \*